(12) United States Patent
Itoyama et al.

(10) Patent No.: US 6,681,744 B2
(45) Date of Patent: Jan. 27, 2004

(54) FUEL INJECTION CONTROL DEVICE FOR A DIESEL ENGINE

(75) Inventors: Hiroyuki Itoyama, Yokohama (JP); Takanobu Aikawa, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 90 days.

(21) Appl. No.: 10/131,321

(22) Filed: Apr. 25, 2002

(65) Prior Publication Data
US 2002/0179072 A1 Dec. 5, 2002

(30) Foreign Application Priority Data

May 30, 2001 (JP) ........................................ 2001-162175

(51) Int. Cl.[7] ........................ F02M 59/20; F02M 25/07
(52) U.S. Cl. .................. 123/480; 123/501; 123/568.21
(58) Field of Search ................................ 123/478, 480, 123/501, 502, 568.21

(56) References Cited

U.S. PATENT DOCUMENTS 4,596,221 A  *  6/1986  Ament et al. ................ 123/501

FOREIGN PATENT DOCUMENTS

| JP | 1-155051 | * | 6/1989 | ............ 123/568.28 |
| JP | 2000-54901 | | 2/2000 | |

* cited by examiner

*Primary Examiner*—Tony M. Argenbright
(74) *Attorney, Agent, or Firm*—Foley & Lardner

(57) ABSTRACT

In a diesel engine (1) provided with an exhaust gas recirculation mechanism (9, 10), a fuel injection timing is calculated by considering a delay of air aspirated by the cylinders of the engine (1) and a delay of exhaust gas recirculation. By performing fuel injection based on this fuel injection timing, conditions of combustion in a cylinder of the engine (1) are improved.

12 Claims, 18 Drawing Sheets

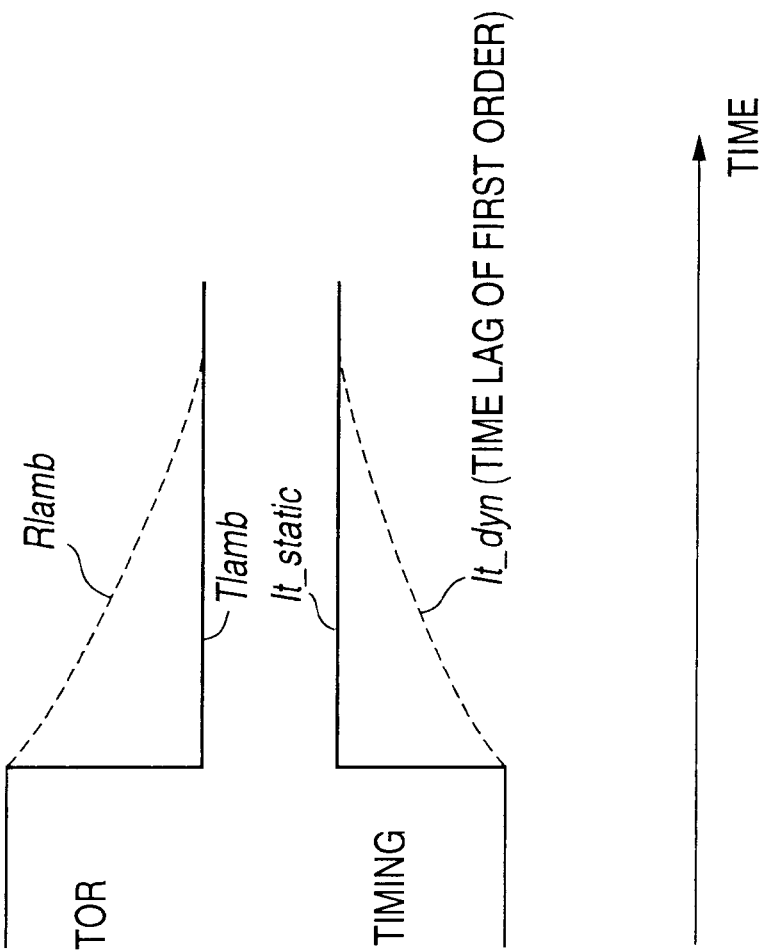

FUEL INJECTION CONTROL DEVICE FOR A DIESEL ENGINE

FIELD OF THE INVENTION

This invention relates to fuel injection control of a diesel engine for a vehicle.

BACKGROUND OF THE INVENTION

JP2000-54901A published by the Japanese Patent Office in 2000 discloses a fuel injection controller of a diesel engine which adjusts the fuel injection timing of a fuel according to the magnitude of a difference between a target intake air amount and a real intake air amount, when the difference arises.

SUMMARY OF THE INVENTION

In a diesel engine provided with an exhaust gas recirculation (EGR) mechanism, recirculated exhaust gas becomes a part of the air aspirated by the engine, so the delay of recirculated exhaust gas poses a problem. As the above-mentioned conventional fuel injection takes only the delay of the fresh air into account, it is inapplicable to a diesel engine provided with an EGR device.

When the intake air amount of an engine varies owing to a rapid change in a engine load etc., the exhaust gas recirculation amount actually aspirated by the engine accompanies with a time lag to the target exhaust gas recirculation amount calculated by a controller.

As the recirculated exhaust gas forms part of the intake air, the real excess air ratio of the engine is delayed relative to a target excess air ratio calculated by the controller. If the fuel injection timing is adjusted by calculating the difference between the target excess air ratio and a real excess air ratio without correcting for this delay, the timing that a fuel injection device injects fuel shifts from an optimal fuel injection timing. In this case, the engine generates a noise and a torque shock, which causes discomfort to the driver.

It is therefore an object of this invention to provide a fuel injection controller of a diesel engine for a vehicle which takes the delay of the exhaust gas recirculation into account, and adjusts the fuel injection timing of the fuel accordingly.

To achieve the above object, a fuel injection control device for a diesel engine is provided with a fuel injection mechanism that controls a timing of fuel injection, an exhaust gas recirculation mechanism that recirculates part of exhaust gas into air introduced into a cylinder of the engine, and a turbocharger that pressurizes fresh air introduced into the cylinder of the engine. The fuel injection control device comprises a sensor that detects a running condition of the engine and a programmable controller.

The programmable controller is programmed to set a basic fuel injection timing based on the running condition of the engine, set a target excess air ratio based on the running condition of the engine, correct the basic fuel injection timing according to a delay of a real exhaust gas recirculation amount to a target exhaust gas recirculation amount, and control a fuel injection timing of the fuel injection mechanism according to to the corrected fuel injection timing.

The details as well as other features and advantages of this invention are set forth in the remainder of the specification and are shown in the accompanying drawings.

BRIEF DESCRIPTION OF THE DRAWINGS

FIGS. 31A–31B are timing chart for describing a real excess air ratio Rlamb and a final fuel injection timing It_dyn for the purpose of adjusting the fuel injection timing when a target excess air ratio Tlamb and a basic fuel injection timing It_static are suddenly changed according to this invention.

DESCRIPTION OF THE PREFERRED EMBODIMENTS

Figure 1:
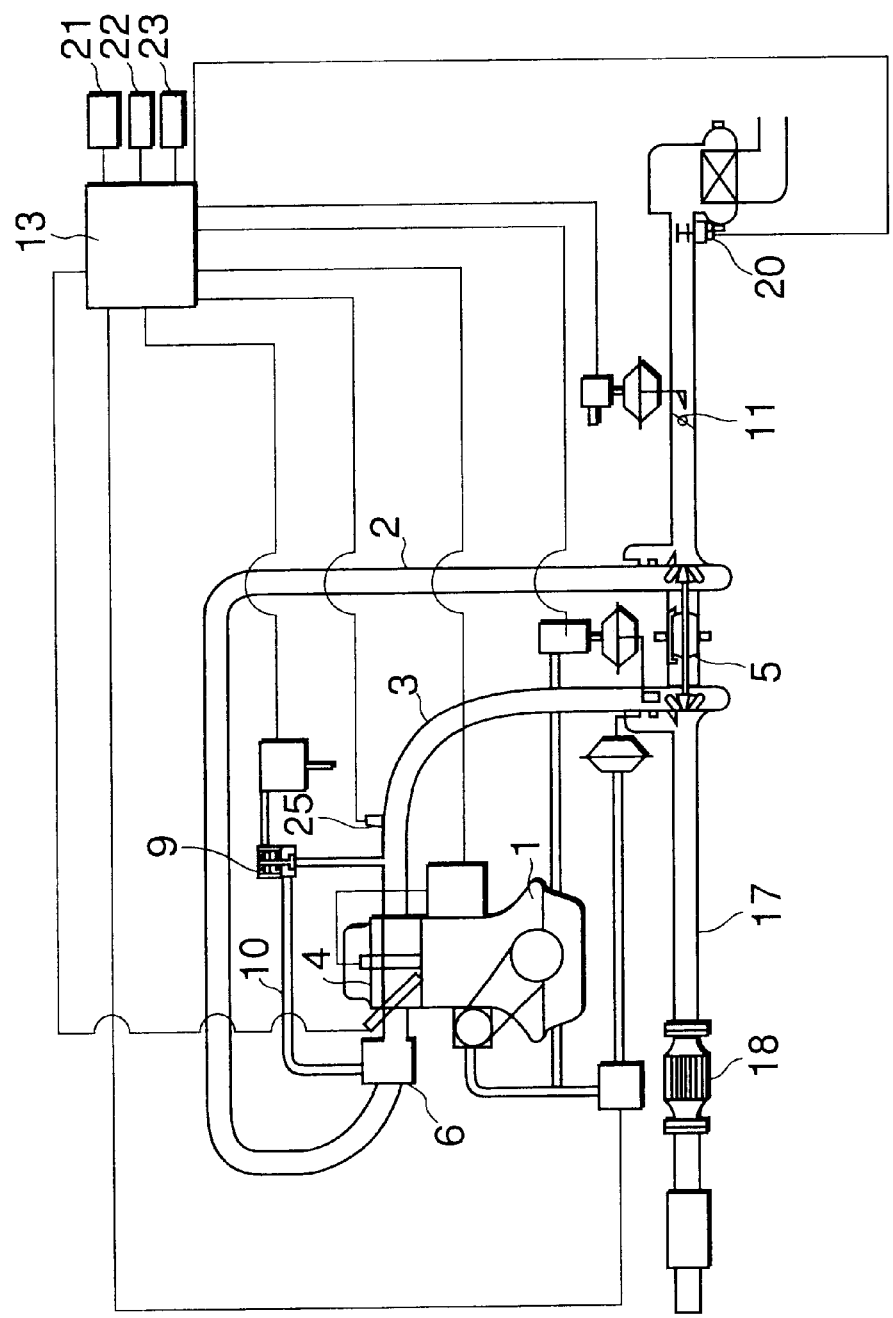
FIG. 1 is a schematic diagram of a diesel engine with a fuel injection controller according to this invention.

Referring to FIG. 1 of the drawings, a diesel engine comprises an engine 1, a intake air throttle 11, a turbocharger 5, a fuel injection valve 4, an intake air pipe 2, an intake manifold 6, an exhaust manifold 3, an exhaust pipe 17, an exhaust gas recirculation passage 10, nitrogen oxide (NOx) catalyst 18, and an exhaust gas recirculation valve 9.

An air flow sensor 20 and an intake air throttle 11 are provided with the intake air pipe 2 which is connected to an intake manifold 6.

An exhaust gas oxygen concentration sensor 25 and the NOx catalyst 18 are provided with the exhaust pipe 17 which is connected to the exhaust manifold 3.

The EGR mechanism comprises the exhaust gas recirculation passage 10 and the exhaust gas recirculation valve 9 that controls the exhaust gas recirculation amount. The exhaust gas recirculation passage 10 connects the intake manifold 6 and the exhaust manifold 3 to recirculate part of the exhaust gas to the engine 1.

The intake air throttle 11 adjusts the flowrate of the air aspirated from the atmosphere. The turbocharger 5 pressurizes the intake air and supplies it to the intake manifold 6 via the intake air pipe 2. The exhaust gas recirculation passage 10 recirculates part of the exhaust gas into the intake air. The intake manifold 6 distributes a mixture of air and recirculated exhaust gas into the combustion chamber of the engine 1.

The fuel injection valve 4 injects fuel directly into the combustion chamber of the engine 1 by opening the valve. The injected fuel burns with the mixture of air and recirculated exhaust gas in the combustion chamber, and forms combustion gas. The combustion chamber of the engine 1 discharges the combustion gas as exhaust gas to the exhaust manifold 3. The discharged exhaust gas drives the turbocharger 5 using its high pressure.

The NOx catalyst 18 traps hazardous NOx in the exhaust gas to clean the exhaust gas. After cleaned up, the exhaust gas is discharged into the atmosphere via the exhaust pipe 17.

The EGR mechanism 9, 10 recirculates part of the exhaust gas discharged from the engine 1 into the collector of the intake manifold 6 to form the mixture of the intake air and the recirculated exhaust gas. The exhaust gas recirculation valve 9 regulates the flow of the recirculated exhaust gas to make a desired excess air ratio.

Due to this exhaust gas recirculation, the excess air ratio of the air aspirated by the engine 1 is reduced, so generation of NOx can be suppressed.

The fuel injection control device according to this invention comprises a controller 13 that comprises one or more microcomputers having a central processing unit (CPU), a read-only memory (ROM), a random access memory (RAM), and an input/output interface (I/O interface).

The controller 13 controls the fuel injection timing by controlling the opening timing and closing timing of the fuel injection valve 4 by sending an injection signal to the fuel injection valve 4.

To detect signals representing engine running conditions, the controller 13 is connected via signal circuits to a crank angle sensor 21 which detects an engine rotation speed Ne, an accelerator pedal depression sensor 22 which detects an accelerator pedal depression Cl, an engine cooling water temperature sensor 23 which detects an engine cooling water temperature Tw, an air flow sensor 20 which detects an intake air amount Us, and an oxygen concentration sensor 25 which detects an exhaust gas recirculation oxygen concentration Soafr. Based on these signals, the controller 13 determines the fuel injection timing, and outputs the injection signal to the fuel injection valve 4.

By performing the routine described below, the controller 13 determines the excess air ratio of the air supplied to the engine 1. The controller 13 controls the exhaust gas recirculation valve 9 to mach the exhaust gas flowing through the exhaust gas recirculation passage 10 with the exhaust gas recirculation amount calculated based on the determined excess air ratio.

All of the maps mentioned in the following explanation are stored in the ROM of the controller 13 in advance. Unless otherwise noted, each of these routines is executed repeatedly at an interval of four milliseconds while the diesel engine 1 is running.

To perform the above control, the controller 13 determines a final injection timing by performing the routines shown in FIGS. 2, 4, 6, 9, 12, 14, 15, 16, 17, 19, 21, and 22.

Figure 2:
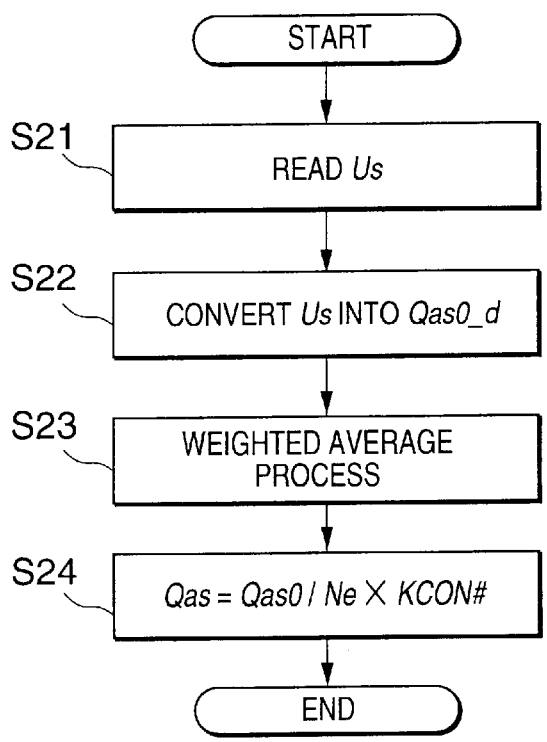
FIG. 2 is a flowchart describing a routine for computing an intake air amount Qac, performed by a controller according to this invention.
Figure 3:
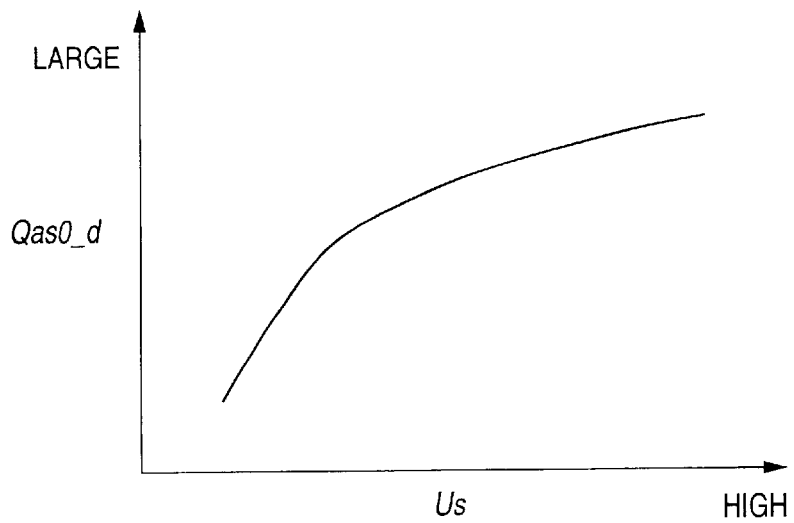
FIG. 3 is a diagram describing the characteristics of a map that transforms an airflow meter output voltage into an intake air flow Qas0_d, stored by the controller.

Referring to FIG. 2, in a step S21, an output voltage Us from the air flow sensor 20 is sampled. In a step S22, the output voltage Us is converted to an air flowrate Qas_d by referring to a map having the characteristics shown in FIG. 3. In a step S23, the converted air flowrate Qas0_d, is weighted averaged to calculate an average air flowrate Qas0. This weighted average processing eliminates the effect of the pressure pulsation on the intake air flow. In a step S24, an intake air flowrate Qac is calculated using the equation below:

$$Qac = Qac0/Ne \times Kcon\#$$

where, Kcon#=constant.

Figure 4:
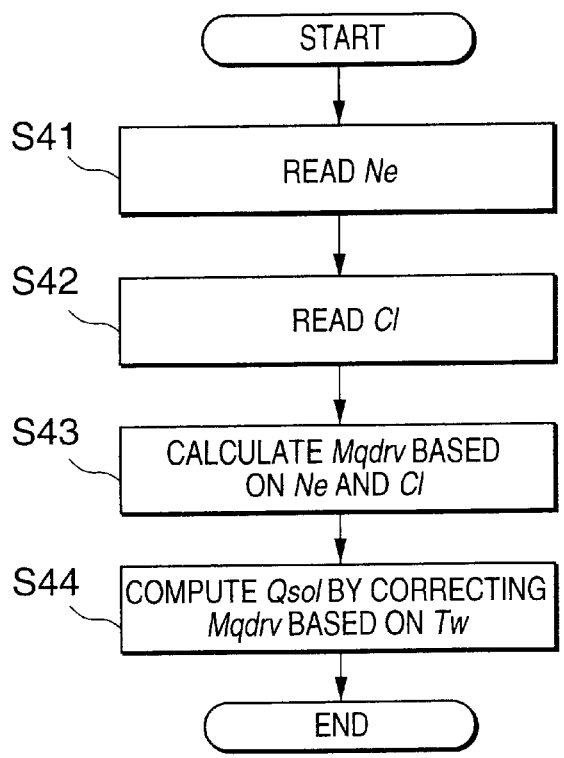
FIG. 4 is a flowchart describing a routine for computing a target fuel injection amount Qsol, performed by the controller.
Figure 5:
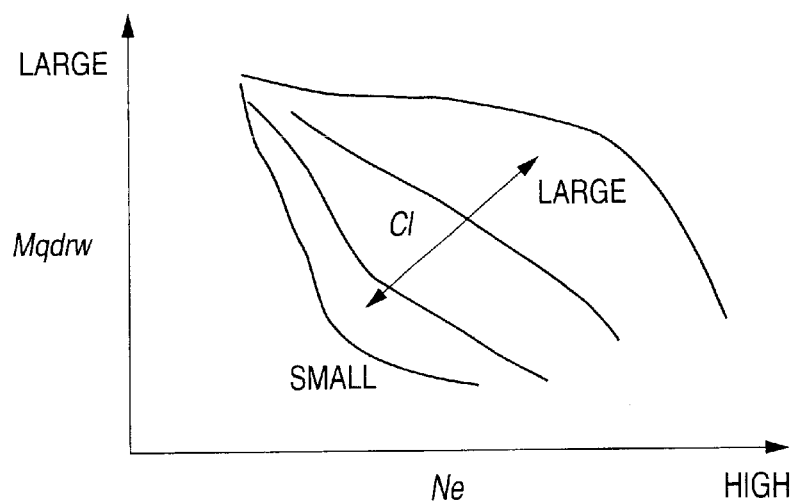
FIG. 5 is a diagram describing the characteristics of a map of a basic fuel injection amount Mqdrv, stored by the controller.

Next, the routine for calculating a target fuel injection amount Qsol is explained referring to FIG. 4. In a step S41, the engine rotation speed Ne is read. In a step S42, the accelerator pedal depression Cl is read. In a step S43, a basic fuel injection amount Mqdrv is computed by looking up a map having the characteristics shown in FIG. 5, using the read engine rotation speed Ne and the accelerator pedal depression Cl. The basic fuel injection amount Mqdrv increases, the larger the accelerator pedal depression Cl. In a step S44, a target fuel injection amount Qsol is calculated by correcting the computed basic fuel injection amount Mqdrv based on the cooling water temperature Tw.

Figure 6:
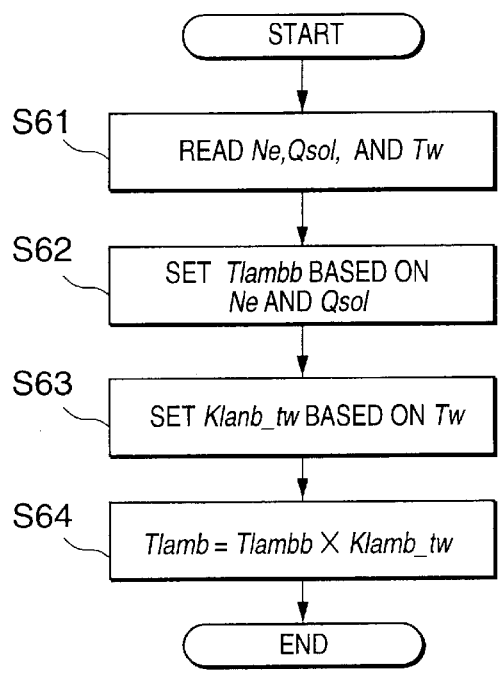
FIG. 6 is a flowchart describing a routine for computing a target excess air ratio Tlamb, performed by the controller.

Next, a routine for computing a target air excess ratio Tlamb is explained referring to FIG. 6. In a step S61, the engine rotation speed Ne, the engine cooling water temperature Tw, and the target fuel injection amount Qsol are read. In a step S62, a basic air excess ratio Tlambb corresponding to the engine rotation speed Ne and the basic target fuel Qsol is computed by looking up a map having the characteristics shown in FIG. 7. The basic air excess ratio Tlambb increases, the larger the target fuel injection amount Qsol. In a step S63, a correction coefficient Klamb_tw corresponding to the engine cooling water temperature Tw is computed by looking up a map having the characteristics shown in FIG. 8. In a step S64, the target air excess ratio Tlamb is calculated using the following equation:

$$Tlamb = Tlambb \times Klamb\_tw$$

In this way, the target air excess ratio Tlamb which stabilizes combustion at a low engine temperature is calculated by correcting the basic air excess ratio Tlambb based on the engine cooling water temperature Tw.

Figure 9:
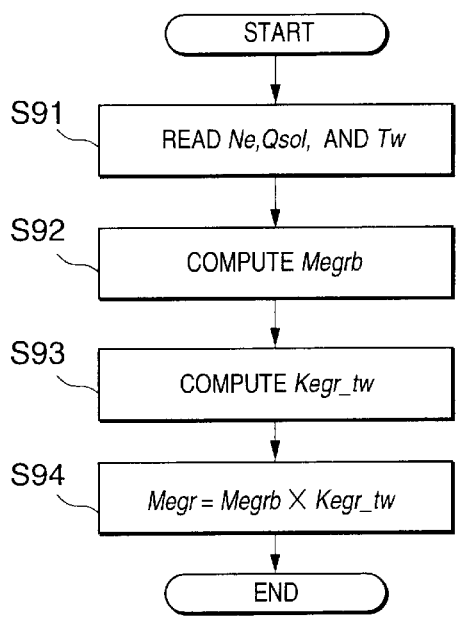
FIG. 9 is a flowchart describing a routine for computing a target exhaust gas recirculation ratio Megr, performed by the controller.

Next, the routine for calculating a target exhaust gas recirculation rate Megr that is the proportion of exhaust gas recirculation amount to the intake air amount is explained referring to FIG. 9. In a step S91, the engine rotation speed Ne, the engine cooling water temperature Tw, and the target fuel injection amount Qsol are read. In a step S92, the basic exhaust gas recirculation Megrb corresponding to the engine rotation speed Ne and the target fuel injection amount Qsol is computed by looking up a map having the characteristics shown in FIG. 10. The basic exhaust gas recirculation Megrb is a ratio of the exhaust gas recirculation amount which is recirculated to suppress generation of nitrogen oxides to the intake air amount, and this value increases, the larger the target fuel injection amount Qsol.

Figures 10, 11:
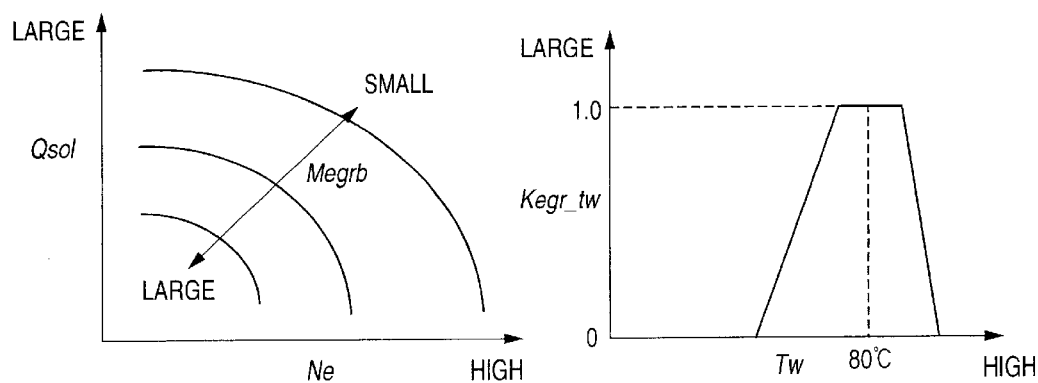
FIG. 10 is a diagram describing the characteristics of a map of a basic target exhaust gas recirculation ratio Megrb, stored by the controller.
FIG. 11 is a diagram describing the characteristics of a map of a correction ratio Kegr_tw, stored by the controller.

In a step S93, a correction coefficient Kegr_tw corresponding to the engine cooling water temperature Tw is computed by looking up a map having the characteristics shown in FIG. 11.

In a step S64, the target exhaust gas recirculation ratio Megr is calculated using the following equation:

$$Megr = Megrb \times Klamb\_tw$$

Figure 12:
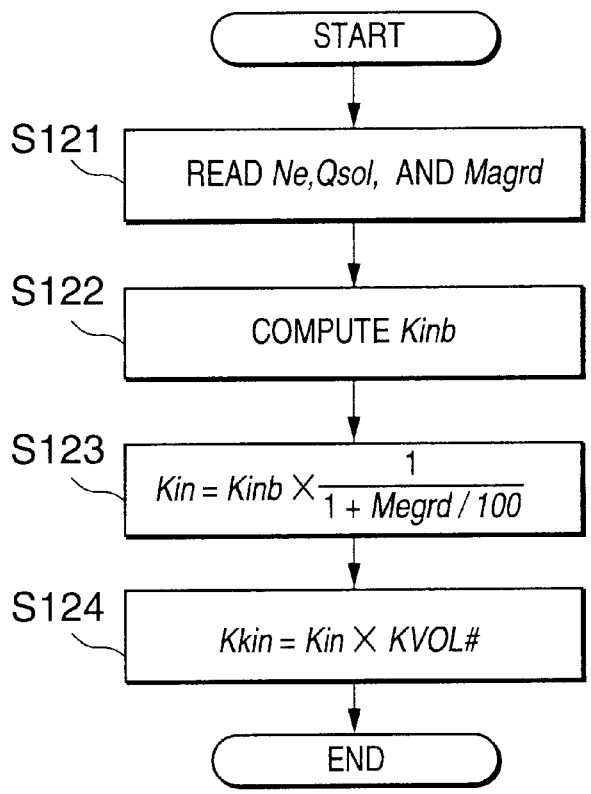
FIG. 12 is a flowchart describing a routine for computing a delay process time constant equivalent Kkin, performed by the controller.

Next, a routine for calculating a delay process time constant equivalent Kkin of the intake air and the recirculated exhaust gas is explained referring to FIG. 12. The intake air of which the flowrate is controlled by the intake air throttle 11 passes in an intake air pipe 2 and the intake manifold 6, and reaches a intake air valve of the cylinder of the engine 1. Likewise, the recirculated exhaust gas of which the flowrate is controlled by the exhaust gas recirculation valve 9 passes in the exhaust gas reticulation passage 10 and intake air manifold 6, and reaches the cylinder of the engine 1. Therefore, a predetermined time is required from the time when the control is applied to the intake air and the recirculated exhaust gas until the time when the control-applied intake air and the control-applied recirculated exhaust gas are introduced into the cylinder of the engine 1. This time lag is referred as "delay". To determine a precise fuel injection timing that is computed by considering the delay, the controller 13 calculates the time constant equivalent Kkin of the delay.

Figure 13:
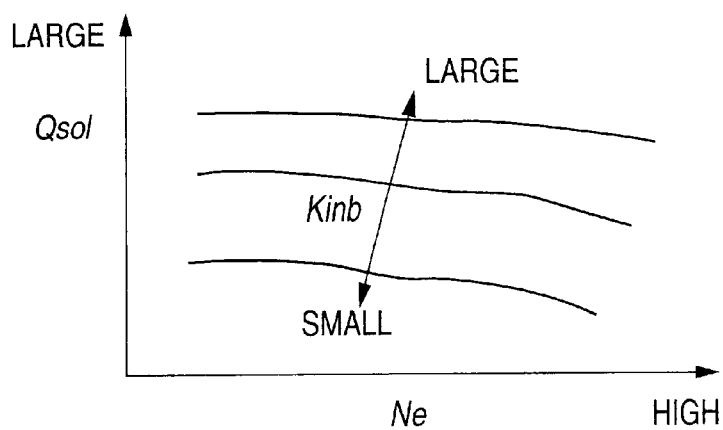
FIG. 13 is a diagram describing the characteristics of a map of a basic delay process time constant equivalent Kinb, stored by the controller.

In a step S121, the engine rotation speed Ne, the real exhaust gas recirculation ratio Megrd, and the target fuel injection amount Qsol are read. In a step S122, a basic volumetric efficiency equivalent kinb corresponding to the engine rotation speed Ne and the target fuel injection amount Qsol is computed by looking up a map having the characteristics shown in FIG. 13. In a step S123, a volumetric efficiency equivalent Kin is calculated using the following equation:

$$Kin = kinb/(1 + Megrd/100)$$

In a step S124, the delay process time constant equivalent Kkin is calculated using the following equation:

$$Kkin = Kin \times Kvol\#$$

where, Kvol#=constant.

Figure 14:
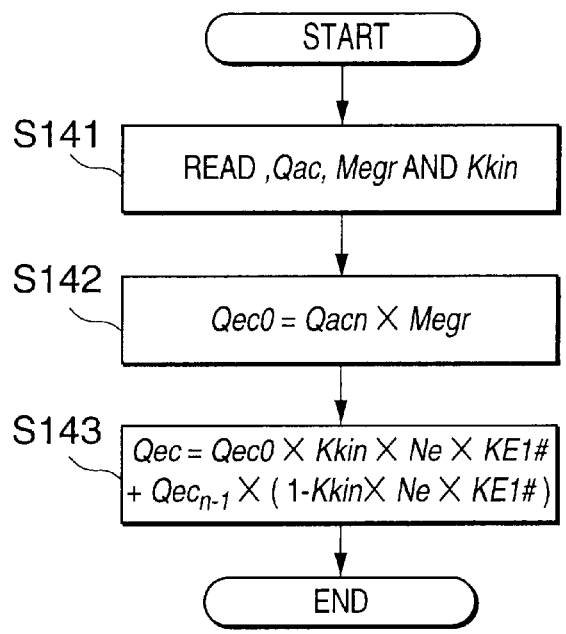
FIG. 14 is a flowchart describing a routine for computing a real exhaust gas recirculation amount Qec, performed by the controller.

Next, a routine for computing an exhaust gas recirculation amount Qec actually introduced into the engine 1 is explained referring to FIG. 14. In a step S141, an intake air amount Qacn computed in the routine execution n-time before, the target exhaust gas recirculation ratio Megr, and the delay process time constant equivalent Kkin are read. In a step S142, a basic target exhaust gas recirculation amount Qec0 is calculated using the following equation:

$$Qec0 = Qacn \times Megr$$

where, Qacn=intake air amount Qac computed by routine execution before a predetermined time.

In a step S143, the real exhaust gas recirculation amount Qec that takes the delay into consideration is calculated using the following equation:

$$Qec = Qec0 \times Kkin \times Ne \times KE1\# + Qec_{n-1} \times (1 \times Kkin \times Ne \times KE1\#)$$

where, KE1#=constant, and
Qec$_{n-1}$=previous value of Qec.

Figure 15:
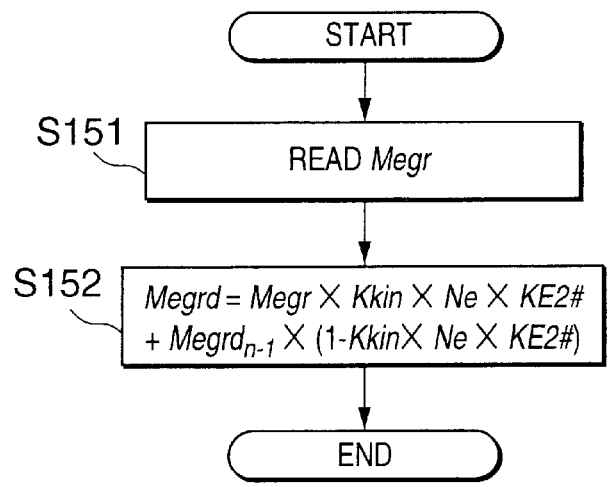
FIG. 15 is a flowchart describing a routine for computing a real exhaust gas recirculation ratio Megrd, performed by the controller.

Next, referring to FIG. 15, a routine for calculating the real exhaust gas recirculation ratio Megrd is explained. In a step S151, the target exhaust gas recirculation ratio Megr and the delay process time constant equivalent Kin are read. In a step S152, the real exhaust gas recirculation Megrd is calculated using the following equation:

$$Megrd = Megr \times Kkin \times Ne \times KE2\# + Megrd_{n-1} \times (1 - Kkin \times Ne \times KE2\#)$$

where, Megrd$_{n-1}$=previous value of Megrd,
and KE2#=constant.

Figure 16:
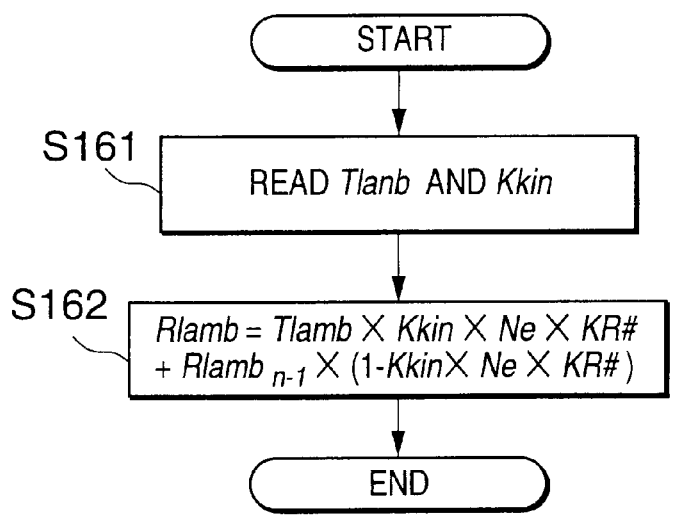
FIG. 16 is a flowchart describing a routine for computing a real excess air ratio Rlamb, performed by the controller.

Next, referring to FIG. 16, a routine for calculating a real excess air ratio Rlamb is explained. In a step S161, a target excess air ratio Tlamb and the delay process time constant equivalent Kkin are read. In a step S162, the real excess air ratio Rlamb is calculated using the following equation:

$$Rlamb = Tlamb \times Kkin \times Ne \times KR\# + Rlamb_{n-1} \times (1 - Kkin \times Ne \times KR\#)$$

where, Rlamb$_{n-1}$=previous value of Rlamb,
and KR# =constant.

Figure 17:
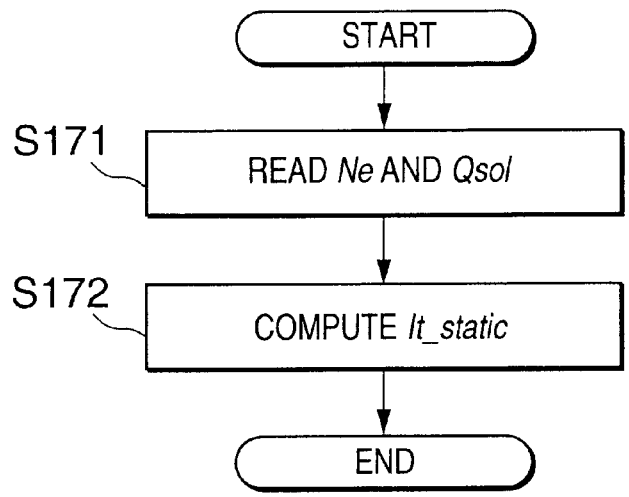
FIG. 17 is a flowchart describing a routine for computing a basic fuel injection timing It_static, performed by the controller.

Next, referring to FIG. 17, a routine for calculating a basic fuel injection timing It_static is described. In a step S171, the engine rotation speed Ne and the target fuel injection amount Qsol are read. In a step S172, the basic fuel injection timing It_static is calculated by looking up a map having the characteristics shown in FIG. 18. The basic fuel injection timing It_static is more advanced, the larger the target fuel injection amount Qsol.

Figure 19:
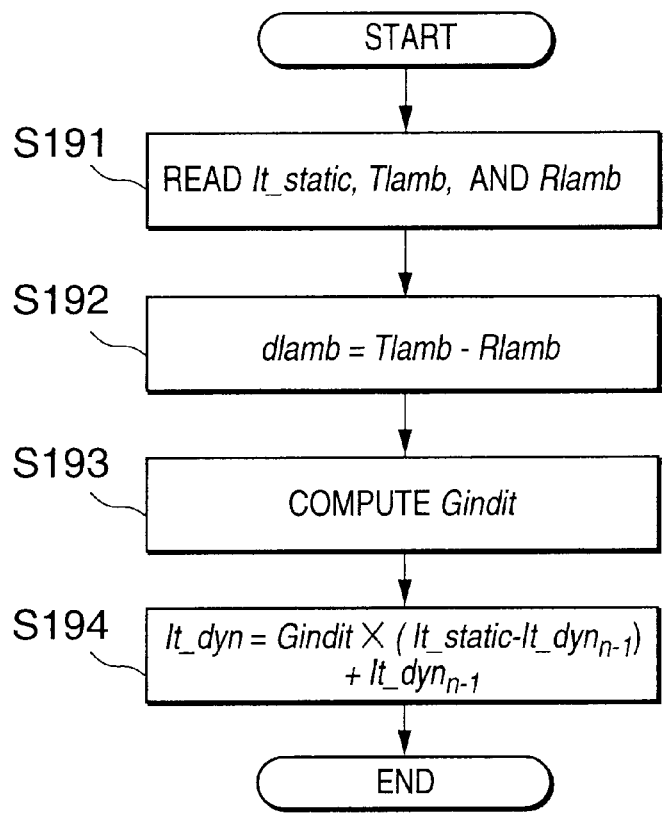
FIG. 19 is a flowchart describing a routine for computing a final fuel injection timing It_dyn, performed by the controller.
Figure 20:
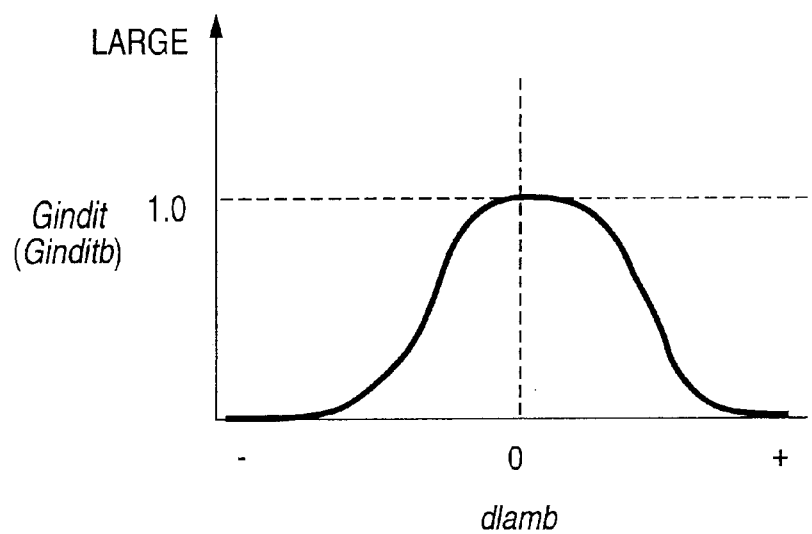
FIG. 20 is a diagram describing the characteristics of a map of a correction ratio Gindit, stored by the controller.

Next, referring to FIG. 19, a routine for computing a final fuel injection timing It_dyn is described. In a step S191, the real excess air ratio Rlamb, the target excess air ratio Tlamb, and the basic fuel injection timing It_static are read. In a step S192, an excess air ratio difference dlamb is calculated by subtracting the real excess air ratio Rlamb from the target excess air ratio Tlamb. In a step S193, a variation rate gain Gindit is calculated by looking up a map having the characteristics shown in FIG. 20. In a step S194, the final fuel injection timing It_dyn is calculated using the following equation:

$$It\_dyn = Gindit \times (It\_static - It\_dyn_{n-1}) + It\_dyn_{n-1}$$

where, $It\_dyn_{n-1}$=previous value of It_dyn.

According to this routine, when the absolute value of the excess air ratio difference dlamb is 0, the variation rate gain Gindit is set to its maximum value of 1.0. The variation rate gain Gindit is set to be larger, the smaller the absolute value of the excess air ratio difference dlamb.

The setting is such that the variation rate gain Gindit is larger, the smaller the absolute value of the excess air ratio difference dlamb, making the final injection timing It_dyn approach the basic fuel injection timing It_static more quickly.

Figure 21:
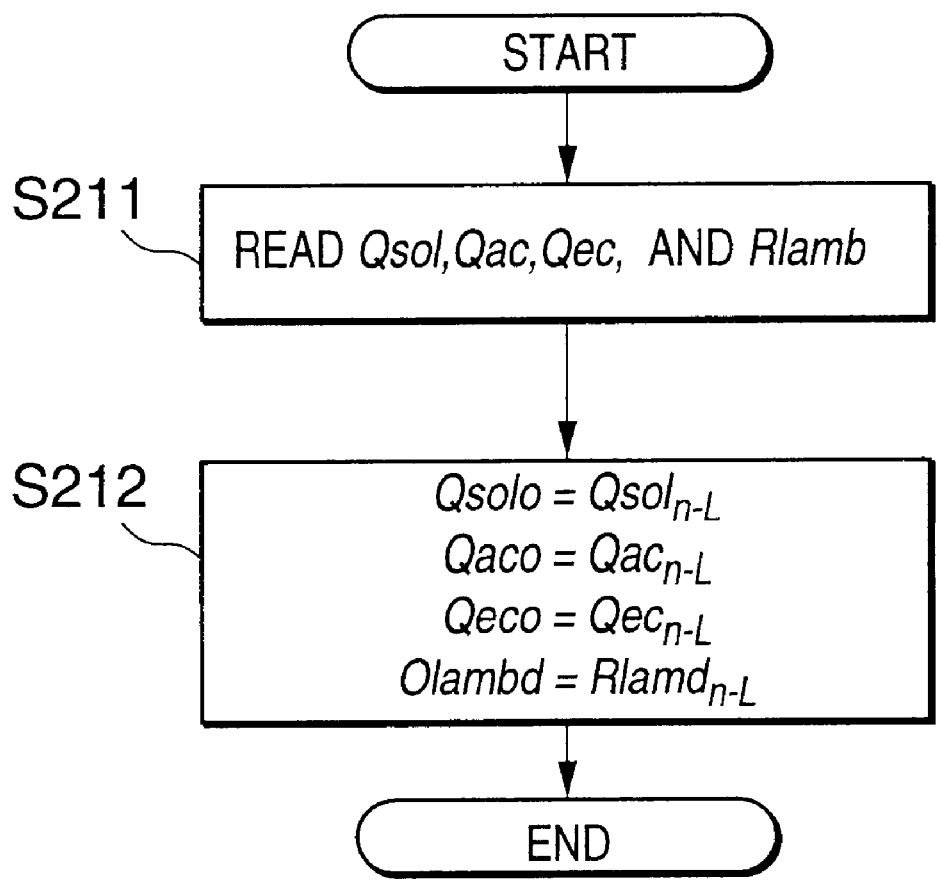
FIG. 21 is a flowchart describing a routine for a delay process, performed by the controller.

Referring to FIG. 21, the routine for obtaining values that computed before a predetermined number of routine executuion times for each of the target fuel injection amount Qsol, the intake air amount Qac, the real exhaust gas recirculation amount Qec, and the real excess air ratio Rlamb is described.

In a step S211, the target fuel injection amount Qsol, the intake air amount Qac, the real exhaust gas recirculation amount Qec, and the real excess air ratio Rlamb are read. In a step S212, the values calculated when the routine was performed L times previously are respectively set as Qsolo, Qaco, Qeco, and Olambd by performing buffer processing.

The advantage of this invention to obtain the real exhaust gas recirculation amount and the real excess air ratio by delay process is now described. By performing the delay process, it is possible to calculate the real exhaust gas recirculation amount Qec and the real excess air ratio Rlamb that are calculated by considering the delay. By adjusting the fuel injection timing based on the difference between this real exhaust gas recirculation amount Qec and the target excess air ratio Tlamb corrected for the delay, the fuel injection timing can be set close to a fuel injection timing for a optimal combustion in the engine 1. Therefore, an engine noise and engine torque shock can be reduced.

In the above embodiment, the basic fuel injection timing It_static is corrected based on the difference between the target excess air ratio Tlamb and the real excess air ratio Rlamb, although the basic fuel injection timing It_static can be corrected based on the difference between the sum of the real intake air amount Qac and the real exhaust gas recirculation amount Qec, and the sum of the target intake air amount and the target exhaust gas recirculation amount. Moreover, this invention can also correct the basic fuel injection timing It_static based on the difference between the target exhaust gas recirculation amount and the real exhaust gas recirculation amount. In these cases, the effect is identical.

Figure 22:
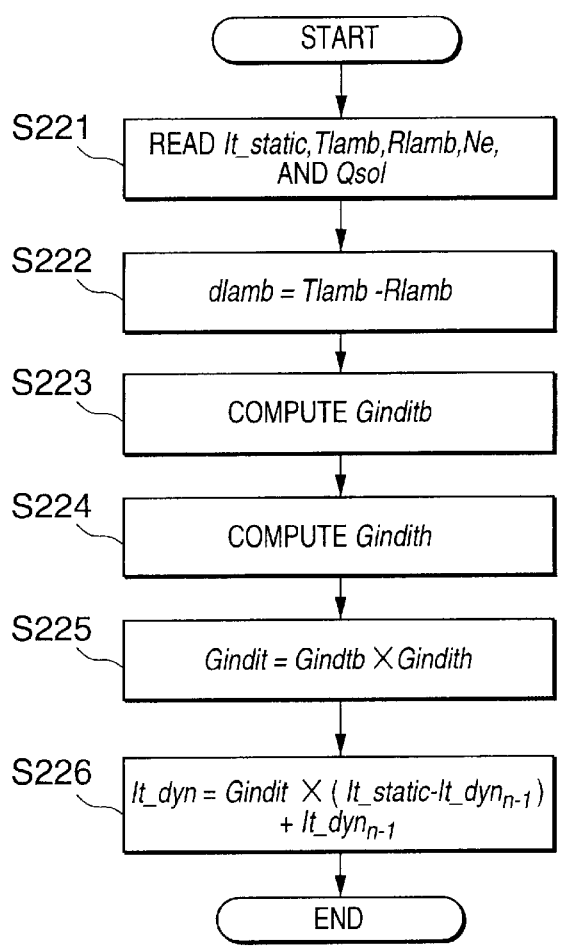
FIG. 22 is a flowchart describing a routine for computing a final fuel injection timing It_dyn, performed by the controller according to a second embodiment of this invention.

Next, a second embodiment of this invention will be described referring to FIG. 22.

In this embodiment, in order to calculate the final fuel injection timing It_dyn, the routine described below is performed instead of the routine shown in FIG. 19.

In a step S221, the real excess air ratio Rlamb, the target excess air ratio Tlamb, the basic fuel injection timing It_static, the engine rotation speed Ne, and the target fuel injection amount Qsol are read. In a step S222, the excess air ratio difference dlamb is calculated. In a step S223, a basic variation rate gain Ginditb based on the excess air ratio difference dlamb is calculated by looking up a map having the characteristics shown in FIG. 20.

Figure 23:
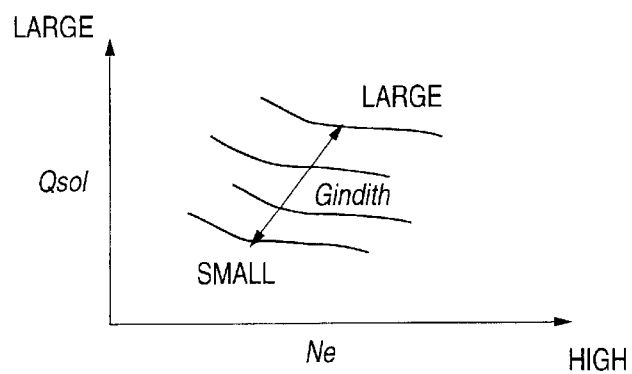
FIG. 23 is a diagram describing the characteristics of a map of a correction ratio Gindith, stored by the controller according to a second embodiment of this invention.

In a step S224, a correction coefficient Gindith corresponding to the engine rotation speed Ne and the target fuel injection amount Qsol is calculated by looking up a map having the characteristics shown in FIG. 23. In a step S225, to calculate the variation rate gain Gindit, the basic variation rate gain Ginditb is multiplied by the correction coefficient Gindith.

In a step S226, the final fuel injection timing It_dyn is calculated using the following equation:

$$It\_dyn = Gindit \times (It\_static - It\_dyn_{n-1}) + It\_dyn_{n-1}$$

where, $It\_dyn_{n-1}$=previous value of It_dyn.

Correcting the basic variation rate gain Ginditb based on the correction coefficient Gindith prevents an excessive adjust of the fuel injection timing when the load of the engine 1 varies sharply. That is, the fuel injection timing can follow the change of the real excess air ratio Rlamb to realize an optimal control during transition.

Next, a third embodiment of this invention will be described referring to FIG. 24.

In this embodiment, the routine described below is performed to calculate the real excess air ratio Rlamb instead of the routine shown in FIG. 16.

Figure 24:
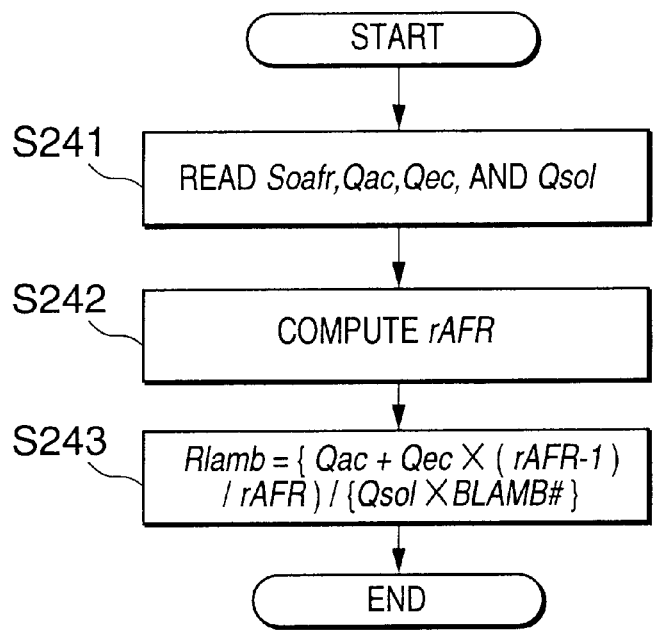
FIG. 24 is a flowchart describing a routine for computing a real excess air ratio Rlamb, performed by the controller according to a third embodiment of this invention.
Figure 25:
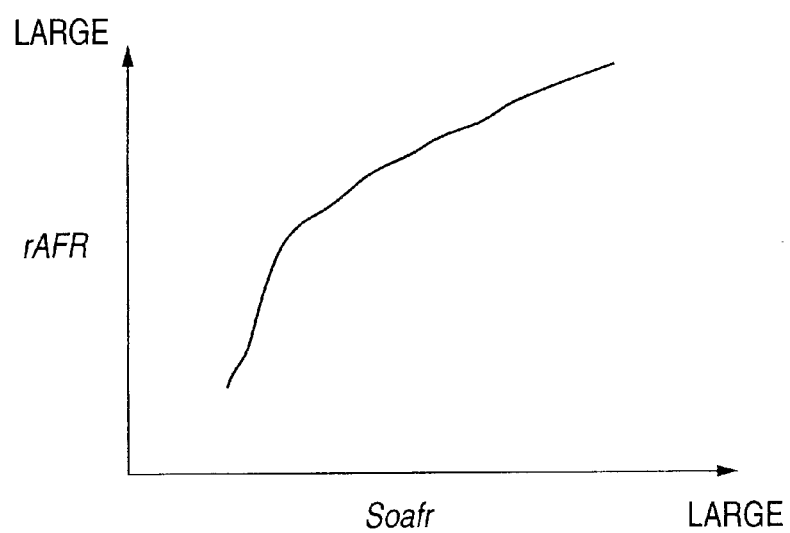
FIG. 25 is a diagram describing the characteristics of a map that transforms exhaust gas oxygen concentration meter output voltage Soafr into oxygen concentration rAFR, stored by the controller according to a third embodiment of this invention.

Referring to FIG. 24, in a step S241, the target fuel injection amount Qsol, the real exhaust gas recirculation Qec and the intake air amount Qac are read. In a step S242, the controller 13 samples an output signal Soafr from the oxygen concentration sensor 25. The controller 13 converts the output signal Soafr into an exhaust gas recirculation oxygen concentration rAFR by looking up a map having the characteristics shown in FIG. 25. In a step S243, the real excess air ratio Rlamb is calculated using the formula below:

$$Rlamb = \{Qac \times Qec \times (rAFR-1)/rAFR\}/(Qsol \times Blamb\#)$$

where Blamb#=14.7.

In this embodiment, the real excess air ratio Rlamb is calculated by calculating the total oxygen amount introduced into the cylinders of the engine 1 from the oxygen amount of the intake air, and the measured oxygen concentration of the recirculated exhaust gas. In this way, a more precise real excess air ratio Rlamb can be calculated.

Figure 26:
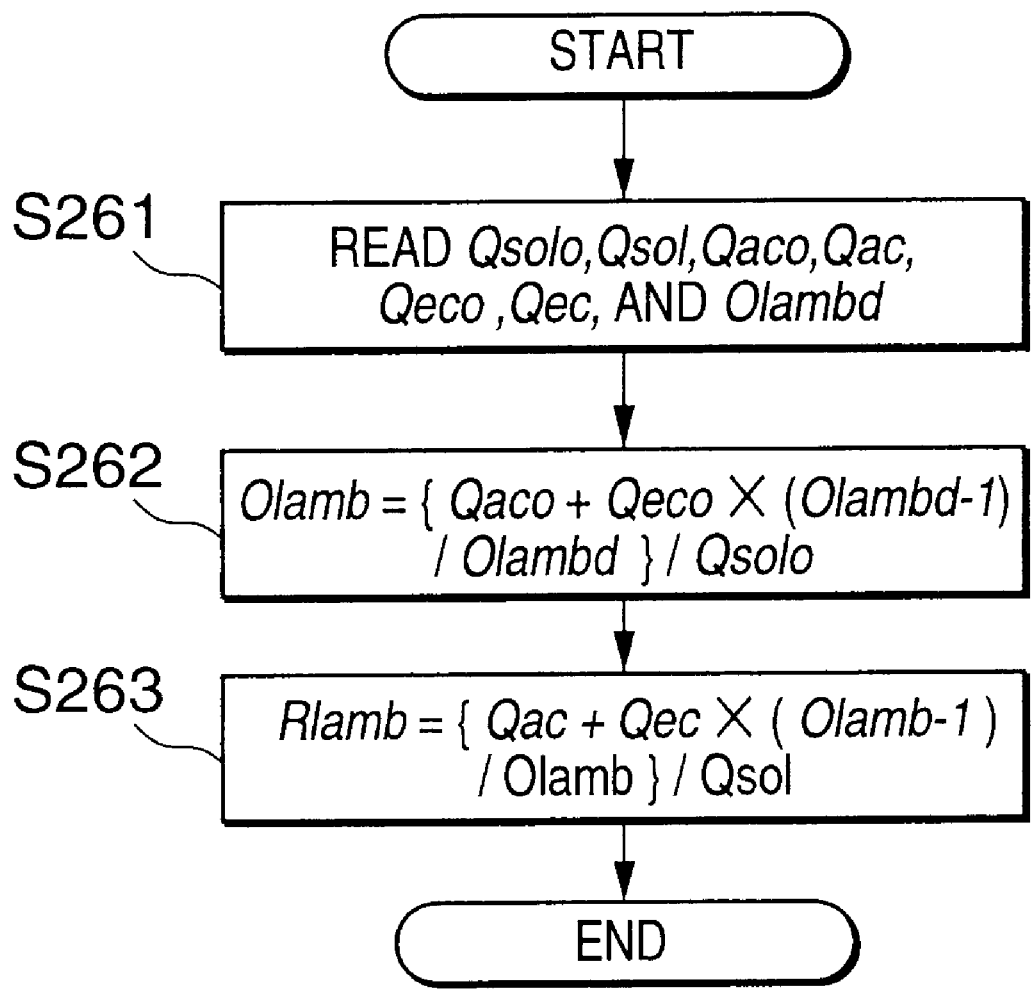
FIG. 26 is a flowchart describing a routine for computing a real excess air ratio Rlamb, performed by the controller according to a forth embodiment of this invention.

Next, a fourth embodiment of this invention will be described referring to FIG. 26. In this embodiment, instead of the routine shown in FIG. 16, the routine described below is performed to calculate the real excess air ratio Rlamb.

In this routine, the real excess air ratio Rlamb is calculated by performing a dynamic process shown below.

In this routine, the variables Qsolo, Qaco, Qeco, and Olambd represent the Lth previous values of the target fuel injection amount Qsol, the intake air amount Qac, the real exhaust gas recirculation amount Qec, and the real excess air ratio Rlamb, respectively. The variable L is experimentally determined.

In a step S261, the variables Qsolo, Qaco, Qeco, and Olambd are read. The target fuel injection amount Qsol, the intake air amount Qac, the real exhaust gas recirculation amount Qec, and the real excess air ratio Rlamb are also read. In a step S262, the oxygen concentration Olamb in the mixture of intake air and recirculated exhaust gas introduced into the combustion chamber of the engine 1, is calculated using the following equation:

$$Olamb=\{Qaco+Qecox(Olambd-1)/Olamb\}/Qsol$$

In a step S263, the real excess air ratio Rlamb of the mixture of intake air and recirculated exhaust gas introduced into the combustion chambers of the engine 1, is calculated using the following equation:

$$Rlamb=\{Qac+Qec\times(Olamb-1)Olamb\}/Qsol$$

Thus, by calculating the real excess air ratio Rlamb, it becomes unnecessary to attach the oxygen concentration sensor 25 to the exhaust manifold 3, so manufacturing costs can be reduced.

Next, a fifth embodiment of this invention will be described referring to FIG. 27–FIG. 30.

The NOx catalyst 18 with which the diesel engine is provided purifies the exhaust gas by trapping the NOx in the exhaust gas. When a predetermined amount of NOx has been trapped, the NOx catalyst 18 reduces the NOx.

In order to perform this reduction, the controller 13 controls the intake air amount Qac, the exhaust gas recirculation amount Qec, and fuel injection amount Qsol to make the excess air ratio less than 1. If the excess air ratio is less than 1, the diesel engine 1 generates hydrocarbons (HC) and discharges them as one component of the exhaust gas. In the NOx catalyst 18, the generated HC reduces the trapped NOx to form nitrogen, water and carbon dioxide. The NOx in the NOx catalyst is eliminated by this reduction reaction. The generated nitrogen, water and carbon dioxide are discharged into the atmosphere air with the exhaust gas.

The control performed by the controller 13 whereby the excess air ratio is made to become 1 or less, will hereafter be referred to as "rich spike".

Figure 27:
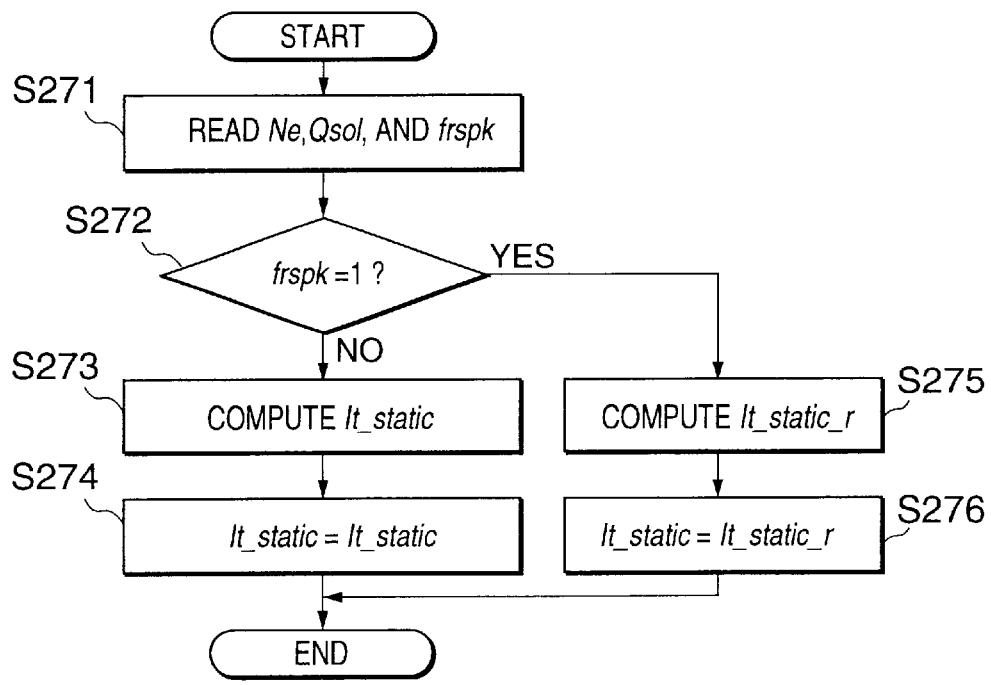
FIG. 27 is a flowchart describing a routine for computing a basic fuel injection timing It_static, performed by the controller according to a forth embodiment of this invention.
Figure 28:
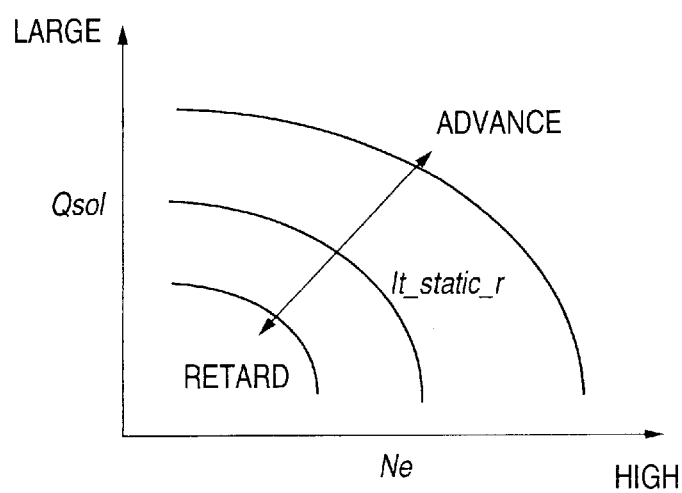
FIG. 28 is a diagram describing the characteristics of a map of a rich spick fuel injection timing It_static_r, stored by the controller according to a forth embodiment of this invention.

To control the fuel injection timing at the time of this rich spike, the controller 13 performs the routine described in FIG. 27. In a step S271, the engine rotation speed Ne, the target fuel injection amount Qsol, and a rich spike flag frspk that indicates whether or not the rich spike operation is undergoing are read. The setting of this rich spike flag frspk will be described later. In a step S272, the controller 13 determines that the conditions for performing a rich spike are not satisfied and advances to S273 if the rich spike flag frspk=0. If the rich spike flag frspk=1, the controller 13 determines that the conditions for performing the rich spike are satisfied, and advances to S275.

Figure 18:
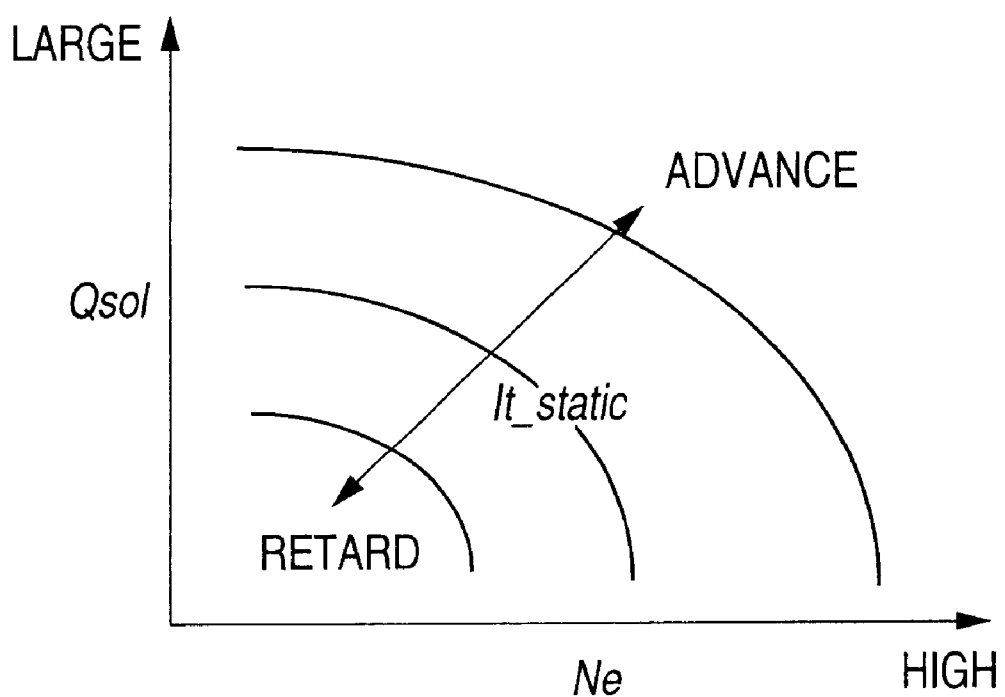
FIG. 18 is a diagram describing the characteristics of a map of a basic fuel injection timing It_static, stored by the controller.

In the step S273, a basic fuel injection timing It_static is calculated by looking up a map having the characteristics shown in FIG. 18, and the routine advances to a step S274. In the step S274, the basic fuel injection timing It_static is used as a basic fuel injection timing It_static without being processed. In the step S275, a rich spike fuel injection timing It_static_r is calculated by looking up a map having the characteristics shown in FIG. 28. In a step S276, the rich spike fuel injection timing It_static_r is set as the basic fuel injection timing It_static.

Figure 29:
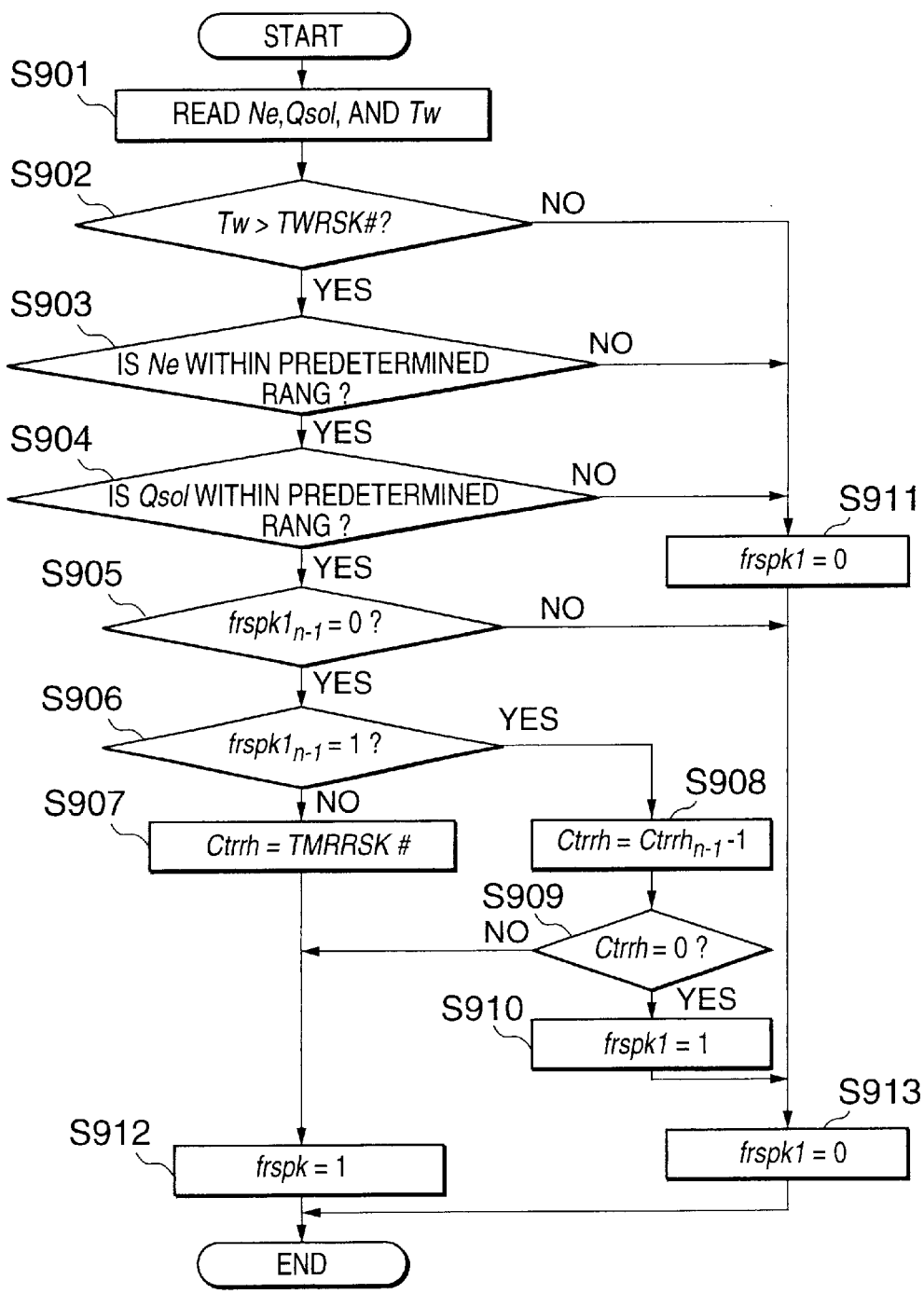
FIG. 29 is a flowchart describing a routine for setting a rich spike flag frspk, performed by the controller according to a forth embodiment of this invention.

Next, referring to FIG. 29, a routine for setting the rich spike flag will be described. In a step S901, the engine rotation speed Ne, the target fuel injection amount Qsol, and the engine cooling water temperature Tw are read. In steps S902–S904, it is determined whether or not the rich spike conditions are satisfied. That is, if the cooling water temperature Tw is higher than a predetermined temperature Twrsk#, the engine rotation speed Ne is in a predetermined rotation speed region, and the target fuel injection amount Qsol is in a predetermined region, it is determined that the rich spike can be performed and the routine advances to a step S905.

If any of the conditions of the steps S902–S904 is not satisfied, the routine resets a rich spike final flag frspk1 to zero in a step S911, resets the rich spike flag frspk to zero in a step S913, and terminates the routine. As an example of applying this control, the decrease of exhaust gas temperature under a low load may be mentioned. In such a case, as an active NOx reduction does not occur, it is not suitable for the rich spike.

In this case, as the target fuel injection amount Qsol is less than a predetermined region, the rich spike conditions are not satisfied and the rich spike is not started.

In a step S905, it is determined whether or not the rich spike final flag frspk1$_{n-1}$ set in the previous iteration is zero. If frspk1$_{n-1}$ is 1, to prevent another rich spike immediately after terminating the rich spike in the previous routine, the routine advances to a step S913 to reset the rich spike flag frspk to zero and to terminate the routine. If frspk1$_{n-1}$ is zero, the routine advances to the step S906 and determines whether or not the frspk1$_{n-1}$ is 1.

In the step S906, if the rich spike flag frspk1$_{n-1}$ set in the previous iteration, the routine determines that the rich spike has started in the previous iteration, and the routine subtracts 1 from previous value Ctrrh$_{n-1}$ of a counter value set in the previous iteration to set a new counter value Ctrrh in a step S908.

In a step S909, it is determined whether or not the counter value Ctrrh is zero. If the counter value Ctrrh is zero, the routine determines that the time of the rich spike presently running has been elapsed, sets the rich spike final flag frspk1 to 1 in a step S910, and terminates the rich spike. Next, the rich spike flag frspk is reset to zero in a step S913, and the routine is terminated.

If determining that the counter value Ctrrh is not zero in the step S909, the routine advances to a step S912, sets the rich spike flag frspk to 1, and terminates the routine. In this case, as it is determined that the rich spike presently being performed has not finished, the rich spike is continued.

In the step S906, if it is determined that the precious rich spike flag frspk1$_{n-1}$ is not 1, it is determined that the rich spike should be started. In the step S907, the routine sets the counter value Ctrrh to a predetermined number of times TMRRSK#. Next, the rich spike flag frspk is set to 1 in the step S912, and the rich spike is started.

Figure 30:
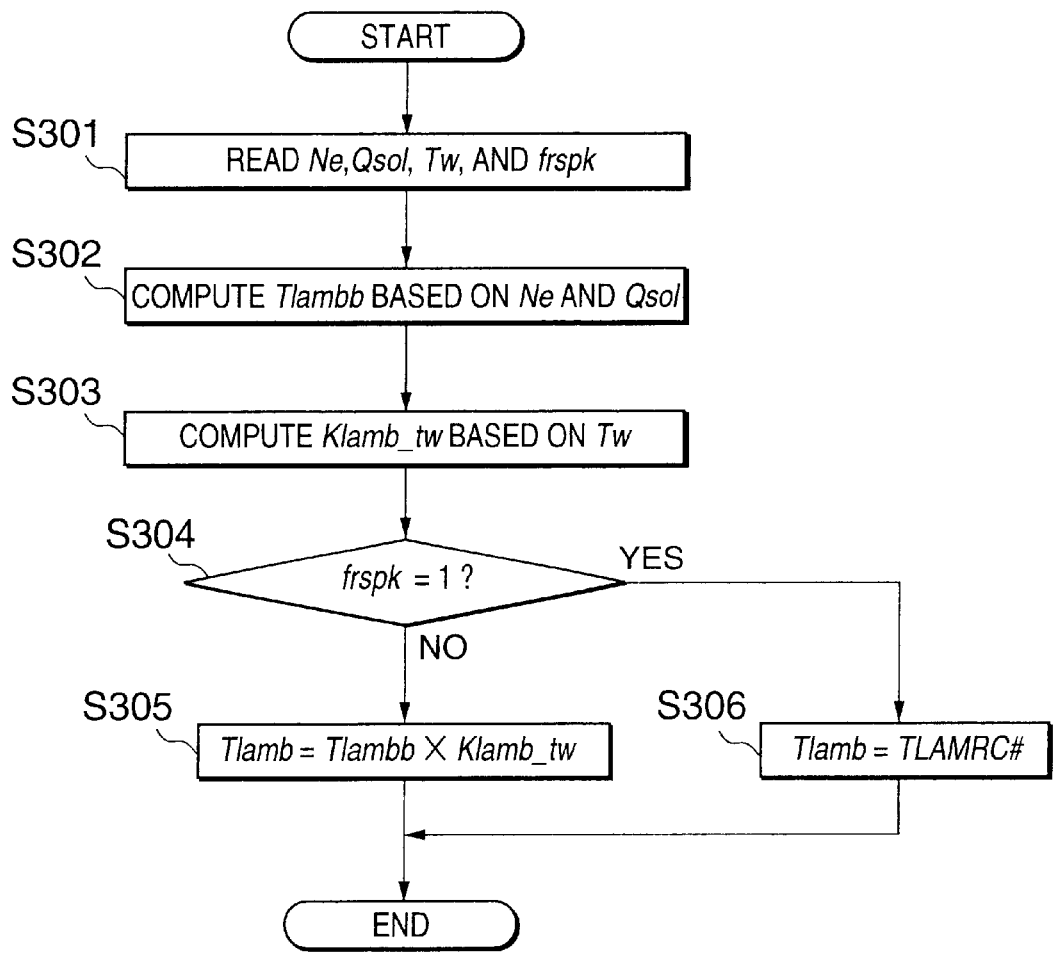
FIG. 30 is a flowchart describing a routine for computing a target excess air ratio Tlamb, performed by the controller according to a forth embodiment of this invention.

Referring to FIG. 30, a routine for computing the target excess air ratio Tlamb when the rich spike is performed will now be described. In a step S301, the engine rotation speed Ne, the target fuel injection amount Qsol, the engine cooling water temperature Tw, and the rich spike flag frspk are read.

Figures 7, 8:
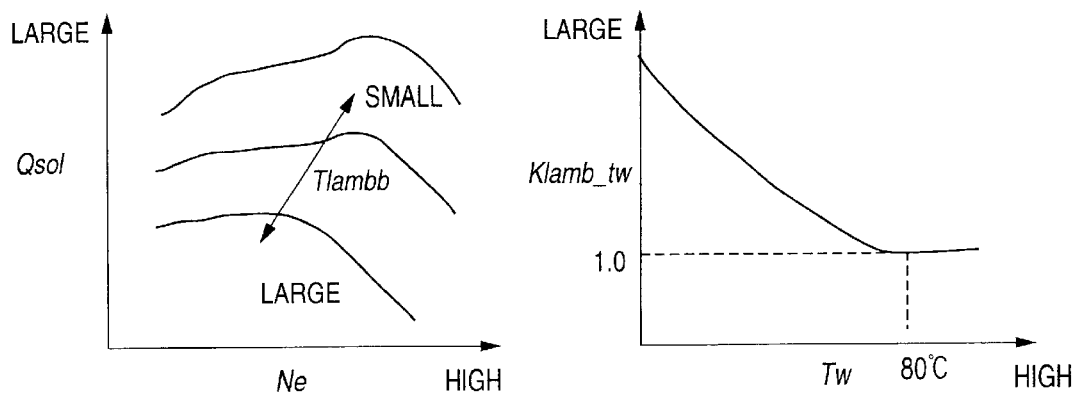
FIG. 7 is a diagram describing the characteristics of a map of a basic target excess air ratio Tlambb, stored by the controller.
FIG. 8 is a diagram describing the characteristics of a map of a correction ratio Klamb_tw, stored by the controller.

In a step S302, the target excess air ratio Tlambb corresponding to the engine rotation speed Ne and the target fuel injection amount Qsol is calculated by looking up a map having the characteristics shown in FIG. 7. In a step S303, a correction ratio Klamb_tw is calculated by looking up a map having the characteristics shown in FIG. 8.

In a step S304, it is determined whether or not the rich spike flag frspk is 1. If the rich spike flag frspk is 1, the routine determines that rich spike is presently performed, sets the target excess air ratio Tlamb to a predetermined value TLAMRC# in a step S306, and terminates the routine. Usually, the predetermined value TLAMRC# is a value to make the excess air ratio less than 1. If the rich spike flag frspk is not 1, the routine determines that the engine is running in not rich spike condition, and calculates the target excess air ratio Tlamb by multiplying the basic target excess air ratio Tlambb by the correction ratio Klamb_tw for the engine cooling water temperature Tw in a step S305.

Thus, when the rich spike is performed where the excess air ratio is low, the fuel injection timing for the rich spike is set independently. Therefore, as the fuel injection timing during the rich spike can be set correctly, the noise and torque shock can be reduced.

Finally, the change of the excess air ratio and fuel injection timing of the fuel injection controller according to this invention will be described referring to FIGS. 31A–31B.

If the engine load is increased rapidly during running as shown in FIG. 31A, the target excess air ratio Tlamb computed by the controller 13 will be decreased stepwise as shown by the full line of FIG. 31A. However, as the excess air ratio of the air actually aspirated by the cylinders is accompanied by the delay, the real excess air ratio Rlamb gradually approaches the target excess air ratio Tlamb as indicated by the broken line of FIG. 31A.

Due to the stepwise reduction of the target excess air ratio Tlamb, the basic fuel injection timing It_static tends to advance the fuel injection timing in stepwise fashion, as shown by the continuous line of FIG. 31B. However, since the final fuel injection timing It_dyn is calculated by applying delay process to the basic fuel injection timing It_static, the final fuel injection timing It_dyn smoothly responds to the step change as shown by the broken line of FIG. 31B instead of a stepwise response.

The entire contents of Japanese Patent Application P2001-162175 (filed on May 30, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel injection control device for a diesel engine, the diesel engine comprising a fuel injection mechanism that controls a timing of fuel injection, a exhaust gas recirculation mechanism that recirculates part of exhaust gas into air introduced into a cylinder of the engine, and a turbocharger that pressurizes fresh air introduced into the cylinder of the engine, the device comprising:

a sensor that detects a running condition of the engine; and a programmable controller programmed to:
set a basic fuel injection timing based on the running condition of the engine;
correct the basic fuel injection timing according to a delay of a real exhaust gas recirculation amount to a target exhaust gas recirculation amount; and
control the fuel injection mechanism based on the corrected injection timing.

2. The fuel injection control device as defined in claim 1, wherein the controller is further programmed to correct the basic fuel injection timing based on a difference between a sum of a real intake air amount and the real exhaust gas recirculation amount, and a sum of a target intake air amount and the target exhaust gas recirculation amount.

3. The fuel injection control device as defined in claim 1, wherein the controller is further programmed to set a target excess air ratio based on the running condition of the engine and to correct the basic fuel injection timing based on a difference between a real excess air ratio and the target excess air ratio.

4. The fuel injection control device as defined in claim 3, wherein the controller is further programmed to calculate the real excess air ratio by applying a delay process to the target excess air ratio.

5. The fuel injection control device as defined in claim 3, wherein the controller is further programmed to calculate the real excess air ratio based on an intake air amount, fuel injection amount, and exhaust gas recirculation amount that are computed before a predetermined number of executions.

6. The fuel injection control device as defined in claim 3, wherein the sensor comprises a sensor that detects a concentration of oxygen in the exhaust gas, and the controller is further programmed to calculate the real excess air ratio based on the detected concentration of oxygen.

7. The fuel injection control device as defined in claim 3, wherein the controller is further programmed to have the corrected fuel injection timing more quickly respond to the basic fuel injection timing, as the difference between the target excess air ratio and the real excess air ratio becomes small.

8. The fuel injection control device as defined in claim 3, wherein the controller is further programmed to calculate the corrected fuel injection timing by using a following equation:

$$It\_dyn = Gindit \times (It\_static - It\_dyn_{n-1}) + It\_dyn_{n-1}$$

where,

It_dyn=corrected fuel injection timing,

Gindit=variation rate gain,

It_static=basic fuel injection timing, and $It\_dyn_{n-1}$=previous value of It_dyn.

9. The fuel injection control device as defined in claim 7, wherein the controller is further programmed to change the speed of response of the corrected fuel injection timing to the basic fuel injection timing, based on the engine condition.

10. The fuel injection control device as defined in claim 3, the device further comprises a catalyst to reduce nitrogen oxides, and wherein the controller comprises a map of the basic fuel injection timing for the reduction of nitrogen oxides, and is programmed to calculate the basic fuel injection timing referring to the map during the reduction.

11. A fuel injection control device for a diesel engine, the diesel engine comprising means for injecting fuel, means for recirculating part of exhaust gas into air introduced into a cylinder of the engine, and means for pressurizing air introduced into the cylinder of the engine, the device comprises:

means for detecting a running condition of the engine;

means for setting a basic fuel injection timing based on the running condition of the engine;

means for correcting the basic fuel injection timing according to a delay of a real exhaust gas recirculation amount to a target exhaust gas recirculation amount; and means for controlling the fuel injection mechanism based on the corrected injection timing.

12. A method for controlling fuel injection for a diesel engine, the diesel engine comprising a fuel injection mechanism that controls a timing of fuel injection, an exhaust gas recirculation mechanism that recirculates part of exhaust gas into air introduced into a cylinder of the engine, and a turbocharger that pressurizes fresh air introduced into the cylinder of the engine, the method comprises:

detecting a running condition of the engine;

setting a basic fuel injection timing based on the running condition of the engine;

correcting the basic fuel injection timing according to a delay of a real exhaust gas recirculation amount to a target exhaust gas recirculation amount; and controlling the fuel injection mechanism based on the corrected injection timing.

\* \* \* \* \*